United States Patent [19]
Fath et al.

[11] Patent Number: 6,045,598
[45] Date of Patent: Apr. 4, 2000

[54] FILTER INSERT

[75] Inventors: Jürgen Fath, Weinheim; Uwe Felber, Absteinach, both of Germany

[73] Assignee: Firma Carl Freudenberg, Weinheim, Germany

[21] Appl. No.: 09/220,473

[22] Filed: Dec. 23, 1998

[30] Foreign Application Priority Data

Dec. 23, 1997 [DE] Germany .............................. 197 57 423

[51] Int. Cl.[7] ................................................... B01D 29/07
[52] U.S. Cl. ................................ 55/490; 55/497; 55/499; 55/502; 55/507; 55/509
[58] Field of Search ............................ 55/497, 499, 502, 55/509, 521, 490, 500, 507; 210/450, 493.1, 493.2, 493.3, 493.4, 493.5

[56] References Cited

U.S. PATENT DOCUMENTS

| | | | |
|---|---|---|---|
| 5,509,950 | 4/1996 | van de Graaf et al. . | |
| 5,620,505 | 4/1997 | Koch et al. | 55/502 |
| 5,755,844 | 5/1998 | Arai et al. | 55/502 |
| 5,792,229 | 8/1998 | Sassa et al. | 55/502 |
| 5,849,187 | 12/1998 | Plaisier | 55/502 |
| 5,879,423 | 3/1999 | Luka et al. | 55/502 |

*Primary Examiner*—David A. Simmons
*Assistant Examiner*—Minh-Chau T. Pham
*Attorney, Agent, or Firm*—Kenyon & Kenyon

[57] ABSTRACT

A filter insert which is insertable in a sealing manner into a filter housing includes an accordion fold pack whose end walls extend perpendicularly with respect to the longitudinal direction of the filter pack. Each of the end walls is surrounded in a sealing manner by a shape-stabilizing, clamp-shaped reinforcing element, each of the reinforcing elements being integrally formed in one piece with a gasket. The gasket is capable of being placed, in a sealing manner under elastic prestressing, against the adjacent housing wall of the filter housing.

14 Claims, 4 Drawing Sheets

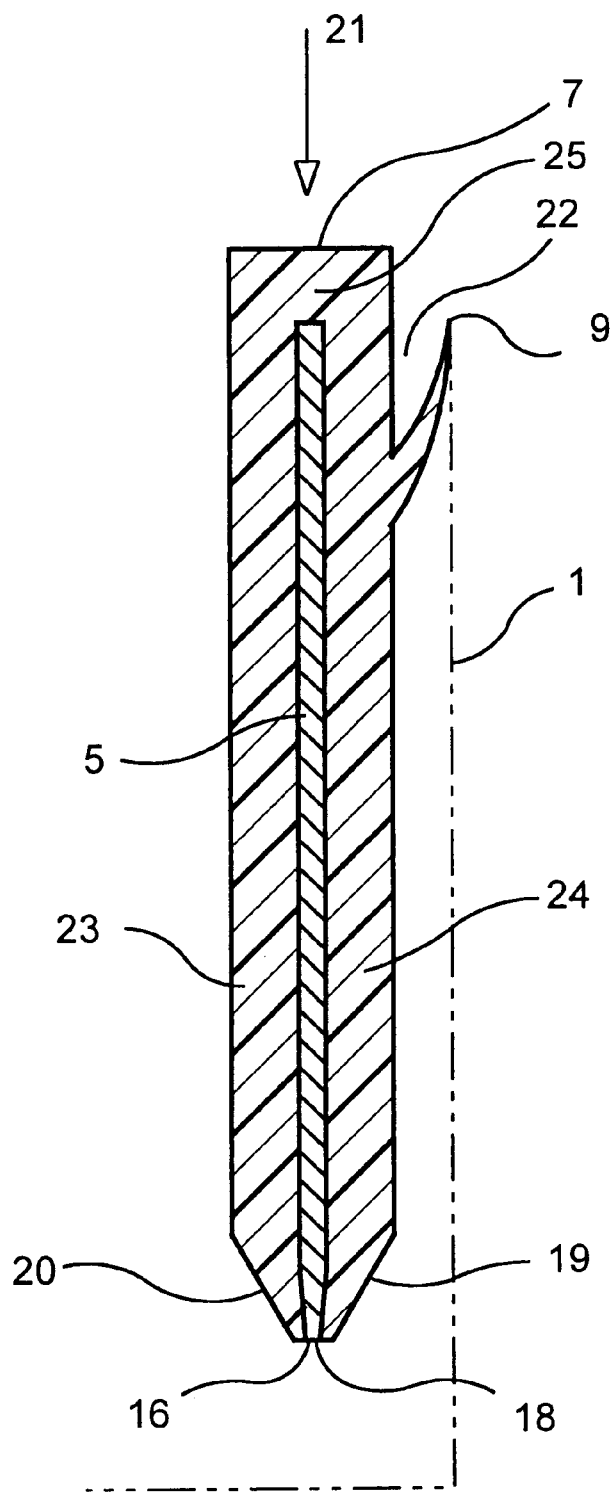
F I G. 1a

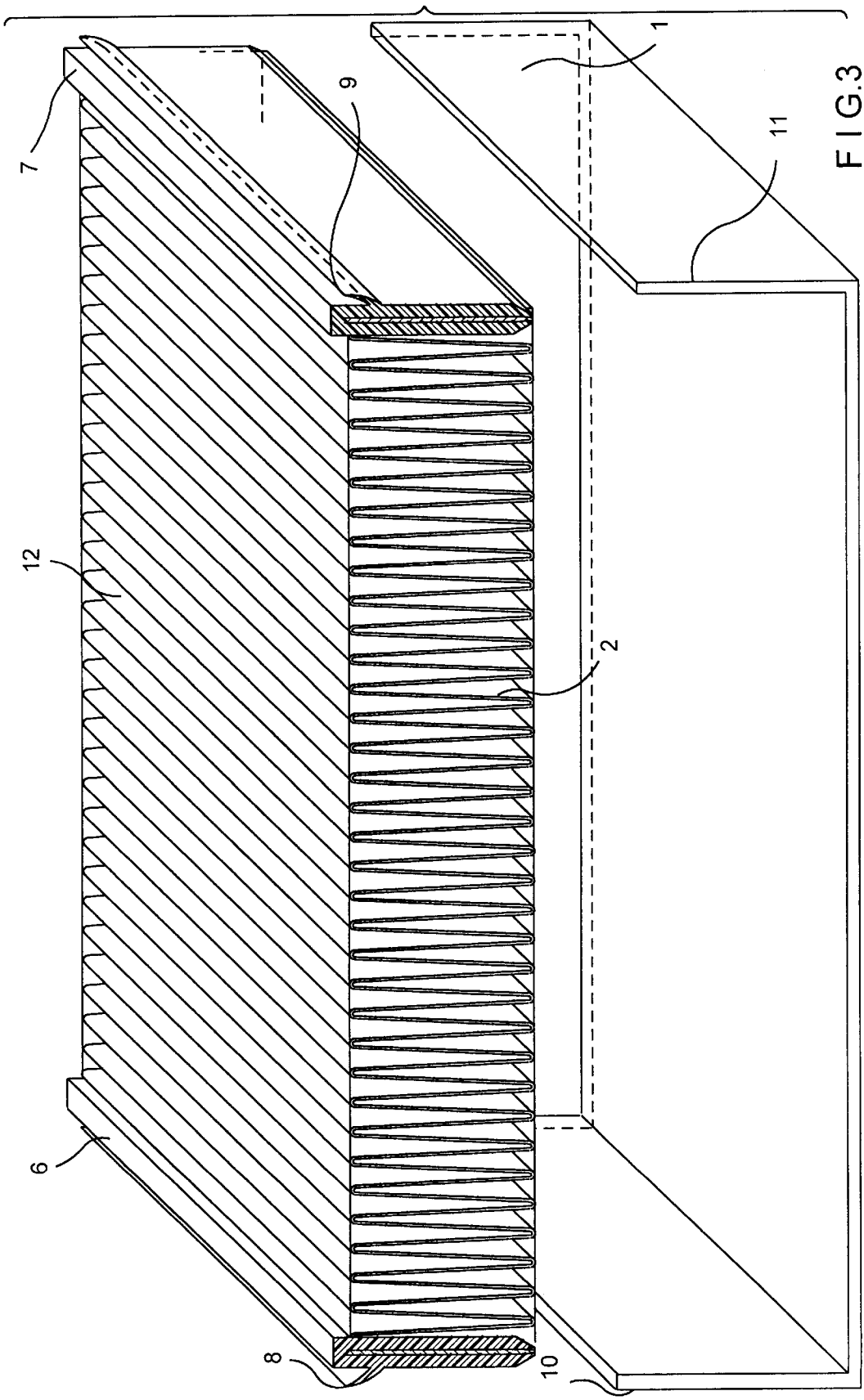

FILTER INSERT

BACKGROUND OF THE INVENTION

The present invention relates to a filter insert which is insertable in a sealing manner into a filter housing.

A filter insert of this kind is set forth in German Patent No. 92 09 362 U1. The filter insert has an accordion fold pack glued to a stabilizing strip along each of its longitudinal sides, each of the stabilizing strips being equipped with a gasket on the side facing toward the filter housing. The filter insert furthermore has a retention frame with longitudinal and transverse frame sections into which the accordion fold pack may be inserted. The end-edge sections of the accordion fold pack are inserted into receiving mechanisms in the retention frame.

SUMMARY OF THE INVENTION

The present invention has the object of further developing a filter insert of the type noted above, in such a way that the filter insert requires few parts and is thus easy and economical to produce in terms of production engineering and cost-effectiveness.

To achieve this object, a filter insert is provided which is insertable in a sealing manner into a filter housing surrounding the accordion fold pack filter. The filter has end walls extending perpendicularly with respect to its longitudinal extent. Each such wall is surrounded in a sealing manner by a shape-stabilizing, clamp-shaped reinforcing element, and each of the reinforcing elements is integrally formed in one piece with and of the same material as a gasket. The gaskets are capable of being placed, in a sealing manner, under elastic prestressing, against the adjacent housing wall of the filter housing. An advantage here is that the reinforcing element and the gasket are combined in one structural component, and the filter insert thus requires few parts and may be produced both easily and inexpensively.

According to a first embodiment, the end walls of the filter element and the reinforcing elements may be fixed together by adhesion. One advantage of this approach is that even relaxation with respect to the end walls of the accordion fold pack over an extended period of use will not result in leaks, since such a configuration reliably precludes a short-circuit between the inflow and outflow sides of the accordion fold pack.

According to a further embodiment, the end walls may be surrounded by the reinforcing element without adhesion. An advantage here is that the assembly of the filter insert is further simplified, compared to the embodiment described previously, and there is no problem with separating the filter insert into clearly sorted materials after use, thus simplifying recycling.

The accordion fold pack and the reinforcing elements constitute a unit capable of being preassembled. The few parts involved in the unit reduce assembly errors to a minimum.

The reinforcing elements preferably have an essentially U-shaped configuration, and surround the cut edges of the end walls of the filter in a sealing manner. Such a configuration is an advantage when the accordion fold pack is made of a material permeated with free-flowing particles that improve the filtration effect. Such a material may, for example, be a nonwoven fabric in which particles of activated charcoal are arranged. The U-shaped reinforcing element, which surrounds the cut edge in a U shape and in a sealing manner, reliably prevents the particles from flowing out of the filter material. Hence there is no need for a separate sealing of the cut edges, which would entail considerable production-engineering outlay.

To attain improved sealing of the reinforcing elements on the end walls, provision may be made for the reinforcing elements to have a narrowed open cross-section in the area of their openings, each of the openings, for example, being bounded by two sealing strips associated together in a tong-like arrangement, which are integrally formed in one piece with the reinforcing element, and contacting the end wall in a sealing manner with elevated prestressing.

The reinforcing elements are formed by two legs, which extend parallel to the end wall and are joined by a crosspiece on the side toward the cut edge. The reinforcing element bounds a groove-shaped recess, the base of the groove contacting and closely fitting against the cut edge of the end wall. The sealing strips in a tong-like arrangement yield a narrowed open cross-section in comparison with the cross-section of the groove. The undercutting in the vicinity of the open cross-section results in an increased specific contact pressure in this area.

The gasket is preferably formed by a sealing lip which together with the reinforcing element bounds a V-shaped cross-section opening in the direction of the inflow side. An advantage of this arrangement is that as pressure on the inflow side increases, the sealing lip fits more tightly against the inner side of the housing and provides a reliable seal between the filter insert and the filter housing. The contact pressure of the sealing lip against the housing, which is proportional to the change in the pressure differential between the inflow and outflow side, prevents a short-circuit of the flow between the inflow and outflow side, even if the pressure differential is great.

The reinforcing element is preferably made of polypropylene. Such a material is particularly easy and inexpensive to process.

BRIEF DESCRIPTION OF THE DRAWINGS

The filter insert according to the present invention is described in further detail below with reference to the figures.

FIGS. 1a and 1b schematically illustrate, in cross-section, first and second embodiments of a reinforcing element constructed according to the principles of the invention.

FIG. 3 is a perspective exploded view of the filter insert, reinforcing elements, and housing.

DETAILED DESCRIPTION

Figure 1B:
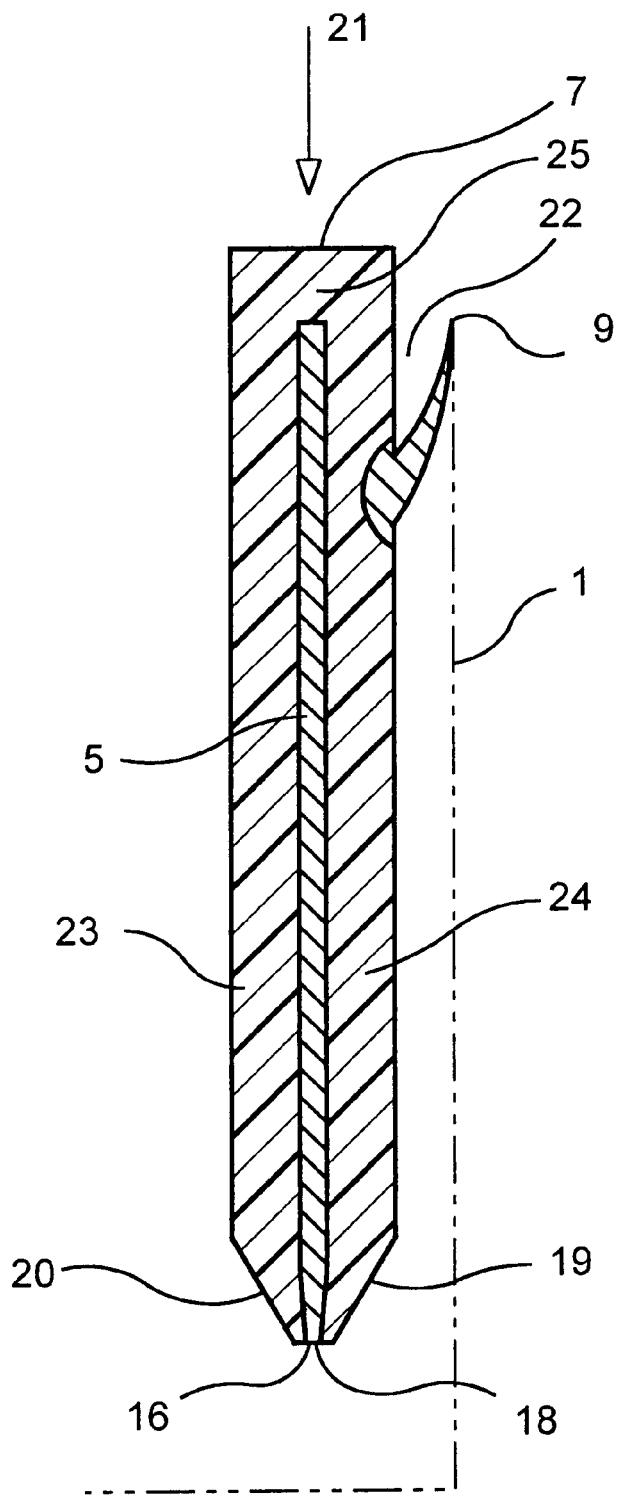

FIG. 1a shows an embodiment of a reinforcing element 7 in a cross-section. Reinforcing element 7 in this exemplary embodiment is made of polypropylene and has an essentially U-shaped cross-section. Gasket 9 is integrally formed in one piece with and of the same material as reinforcing element 7, and together with reinforcing element 7 bounds a V-shaped cross-section 22 opening in the direction of inflow side 21.

The reinforcing element is formed by two legs 23, 24, leg 24 turned toward filter housing 1 being provided with gasket 9. Two legs 23, 24 are joined together by crosspiece 25, and bound a groove. Opening 16 is bounded by two sealing strips 19, 20, associated together in a tong-like arrangement, which are integrally formed in one piece with reinforcing element 7, open cross-section 18 of opening 16 being narrower than the thickness of the material of end wall 5.

FIG. 1b shows a further exemplary embodiment similar to the exemplary embodiment in FIG. 1a, reinforcing element 7 here being integrally formed in one piece with gasket 9, but not of the same material. An advantage here is that gasket 9 can be adapted particularly well to the circumstances of the particular application.

Figure 2:
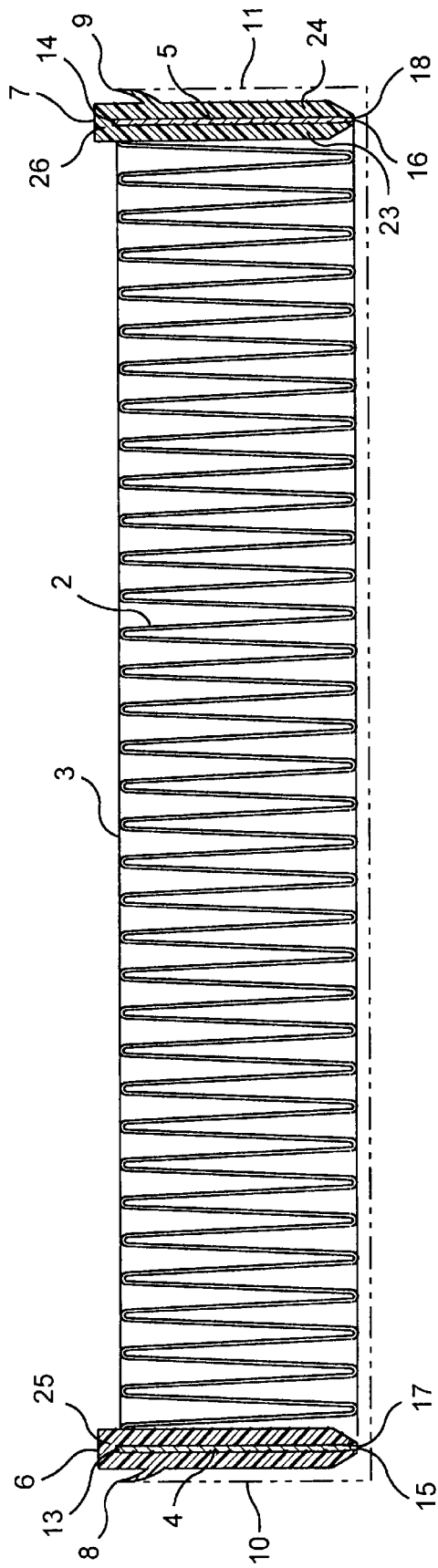
FIG. 2 is a cross-sectional view of an accordion fold pack on which the reinforcing elements are mounted.

FIG. 2 shows an exemplary embodiment of a filter insert in a longitudinal view, accordion fold pack 2 being bounded in longitudinal direction 3 by end walls 4, and 5, which are surrounded in a sealing manner by reinforcing elements 6 and 7. The accordion fold pack 2 is made of a nonwoven fabric, with activated charcoal particles being arranged in the nonwoven fabric.

The inner side of crosspieces 25 contacts the cut edges of the end walls 4 and 5, and, in association with the sealing arrangement of reinforcing elements 6 and 7 on end walls 4 and 5, ensures that the activated charcoal particles embedded in the material are retained within the material.

The two end walls 4 and 5 are surrounded in a sealing manner by shape-stabilizing, clamp-shaped reinforcing elements 6 and 7, with each of the gaskets 8 and 9 being configured as a sealing strip and being capable of being applied against respective housing walls 10 and 11, as indicated with a dash-double-dot line. Each of legs 23, 24 has a thickness no greater than the material width of the individual folds of accordion fold pack 2. This ensures that the folds may be comparatively tightly pleated even in the vicinity of their end sides.

In FIG. 3, the unit in its preassembled state is shown in perspective, including accordion fold pack 2 and two reinforcing elements 6, 7, along with appropriate filter housing 1. When unit 12 is mounted in filter housing 1, each of gaskets 8, 9 fits against adjacent housing wall 10, 11 in a sealing manner, under elastic prestressing. The longitudinal sides of accordion fold pack 2 are also sealed against filter housing 1.

What is claimed is:

1. A filter insert assembly, comprising:
   a filter in the form of an accordion fold pack extending along a longitudinal direction and terminating in end walls that extend perpendicularly to the longitudinal direction, said fold pack defining a plurality of fold lines that extend perpendicularly to the longitudinal direction;
   a housing for containing the accordion fold pack;
   a shape-stabilizing clamp-shaped reinforcing element that surrounds each said end wall in a sealing manner, the reinforcing element having an integral gasket, wherein in an operative configuration the gasket is placed in a sealing manner, under elastic prestressing, against a respective adjacent housing wall of the filter housing.

2. A filter insert as set forth in claim 1, wherein the reinforcing elements and the gaskets are made of the same material.

3. A filter insert as set forth in claim 1, wherein the end walls and the reinforcing elements are joined together by adhesion.

4. A filter insert as set forth in claim 1, wherein the end walls are surrounded by the reinforcing elements without adhesion.

5. A filter insert as set forth in claim 2, wherein the end walls are surrounded by the reinforcing elements without adhesion.

6. A filter insert as set forth in claim 1, wherein the accordion fold pack and the reinforcing elements constitute a unit capable of being preassembled.

7. A filter insert as set forth in claim 1, wherein the reinforcing elements have an essentially U-shaped configuration, and surround edges of the end walls in a sealing manner.

8. A filter insert as set forth in claim 4, wherein the reinforcing elements have an essentially U-shaped configuration, and surround edges of the end walls in a sealing manner.

9. A filter insert as set forth in claim 1, wherein the accordion fold pack is made of a nonwoven fabric having activated charcoal particles.

10. A filter insert as set forth in claim 1, wherein the reinforcing elements have a narrowed open cross-section in the area of the openings of said reinforcing elements.

11. A filter insert as set forth in claim 10, wherein the openings are bounded, in each case, by two sealing strips associated together in a tong-shaped arrangement, which are integrally formed in one piece with the reinforcing element, and contact the end wall in a sealing manner under elevated prestressing.

12. A filter insert as set forth in claim 1, wherein the gasket is formed by a sealing lip which together with the reinforcing element bounds a V-shaped cross-section opening in the direction of incoming flow.

13. A filter insert as set forth in claim 11, wherein the gasket is formed by a sealing lip which together with the reinforcing element bounds a V-shaped cross-section opening in the direction of incoming flow.

14. A filter insert as set forth in claim 1, wherein the reinforcing elements are made of polypropylene.

* * * * *